(12) United States Patent
Beylerian et al.

(10) Patent No.: US 8,079,449 B2
(45) Date of Patent: Dec. 20, 2011

(54) BRAKE PAD COMPRISING A GREASE RESERVOIR

(75) Inventors: Bruno Beylerian, Louvres (FR); Xavier Gouzy, Courbevoie (FR)

(73) Assignee: Robert Bosch GmbH, Stuttgart (DE)

( * ) Notice: Subject to any disclaimer, the term of this patent is extended or adjusted under 35 U.S.C. 154(b) by 952 days.

(21) Appl. No.: 11/851,486

(22) Filed: Sep. 7, 2007

(65) Prior Publication Data
US 2008/0060892 A1 Mar. 13, 2008

(30) Foreign Application Priority Data
Sep. 13, 2006 (FR) ..................... 06 08067

(51) Int. Cl.
*F16D 65/02* (2006.01)
(52) U.S. Cl. ............. 188/250 R; 188/264 B; 188/250 B
(58) Field of Classification Search ............. 188/250 B, 188/250 R, 264 B, 264 R, 261, 250 H, 250 C, 188/250 D, 250 E, 250 F, 250 G, 258, 73.1
See application file for complete search history.

(56) References Cited

U.S. PATENT DOCUMENTS

| | | | |
|---|---|---|---|
| 3,684,061 A | 8/1972 | Ogawa et al. | |
| 4,154,322 A | 5/1979 | Yamamoto et al. | |
| 4,913,263 A * | 4/1990 | Spiers | 184/105.1 |
| 5,320,200 A | 6/1994 | Hashimoto | |
| 5,975,252 A | 11/1999 | Suzuki et al. | |
| 6,116,384 A * | 9/2000 | Matsumoto et al. | 188/73.31 |
| 6,257,379 B1 * | 7/2001 | Matsumoto et al. | 188/73.31 |
| 6,283,258 B1 * | 9/2001 | Chen et al. | 188/250 E |
| 7,370,736 B2 * | 5/2008 | Anda et al. | 188/73.36 |

FOREIGN PATENT DOCUMENTS

EP 0851139 A1 7/1998

OTHER PUBLICATIONS

FR 0608067 Search Report and Opinion.

* cited by examiner

*Primary Examiner* — Bradley King
*Assistant Examiner* — Thomas Irvin
(74) *Attorney, Agent, or Firm* — Michael Best & Friedrich LLP

(57) ABSTRACT

The invention relates to a brake pad (10) for a motor vehicle disk brake, which is intended to be received in a hydraulic braking caliper (12) and which is able to be applied by said caliper (12) against a rotating brake disk, of which an application face (26) is intended to be acted on by at least one end bearing face (18) of the caliper (12), characterized in that the application face (26) of the pad comprises at least one reservoir (28) of grease (32), of which at least one destructible wall (30) is intended to be mounted with a clearance (J) with respect to the bearing face (18) of the caliper (12) during the operation of mounting the pad (10) in the caliper (12), and then to be destroyed by said bearing face (18) during the first application of the pad (10).

20 Claims, 2 Drawing Sheets with grease.

BRAKE PAD COMPRISING A GREASE RESERVOIR

BACKGROUND OF THE INVENTION

The invention relates to a brake pad for a motor vehicle disk brake.

SUMMARY OF THE INVENTION

The invention relates more specifically to a brake pad for a motor vehicle disk brake, of the type which is intended to be received in a hydraulic braking caliper and which is able to be applied by said caliper against a rotating brake disk, and of the type which comprises at least one plate-shaped support of which an active face carries a lining made of a friction material and intended to be applied against the disk, and of which an opposed application face is intended to be acted on by at least one end bearing face of the caliper.

Many examples of brake pads of this type are known.

Such pads are generally received in pairs in floating brake calipers having the form of U-shaped saddles. Each caliper comprises a first branch which receives a hydraulic piston intended to act on one of the two associated pads.

The pad opposed to the pad on which the piston acts is received against a second branch of the caliper, also called "caliper nose", which comprises two parallel fingers against whose bearing faces is received the pad.

When assembling such a caliper, it is necessary to lubricate the mutual contact surfaces of the pad and of the caliper nose fingers so as to allow slight rotations of the pad during braking actions in a plane parallel to the surface of the brake disk.

This lubrication is generally performed with a brush by an operator who coats the bearing faces of the caliper nose fingers and the application face of the pad support with grease.

This operation is relatively awkward since it has to be performed without depositing any grease on the pad lining.

Moreover, the duration of such an operation makes it unsuited to a mass-production assembly process.

To overcome this drawback, the invention provides a brake pad comprising integrated lubricating means.

To this end, the invention provides a brake pad of the above-described type, characterized in that the application face of the pad comprises at least one reservoir of grease, of which at least one destructible wall, which is intended to be directed toward the bearing face of the associated brake caliper, is intended to be mounted with a clearance with respect to said bearing face of the caliper during the operation of mounting the pad in the caliper, and then to be destroyed by said bearing face during the first application of the pad so as to allow diffusion of the grease between the application face of the pad and the bearing face of the associated caliper.

According to other features of the invention:

the wall of the reservoir of grease consists of a destructible film which entraps the grease between said film and the application face, and the edges of which film adhere to the application face, the reservoir comprises at least one fixed wall which is delimited by a cavity which is formed within the thickness of the plate-shaped support and which opens out into the application face, the pad is intended to be received in a caliper substantially taking the form of a U-shaped saddle of which one branch receives a hydraulic piston and of which the other branch comprises two substantially parallel bearing fingers each having a bearing face intended to act on one end of the pad, and it comprises a grease reservoir associated with each of the bearing fingers.

BRIEF DESCRIPTION OF THE DRAWINGS

Other features and advantages of the invention will become apparent on reading the detailed description which follows and which will be understood with reference to the appended drawings, in which.

DETAILED DESCRIPTION

In the description which will follow, identical reference numbers denote parts which are identical or have similar functions.

Figure 1:
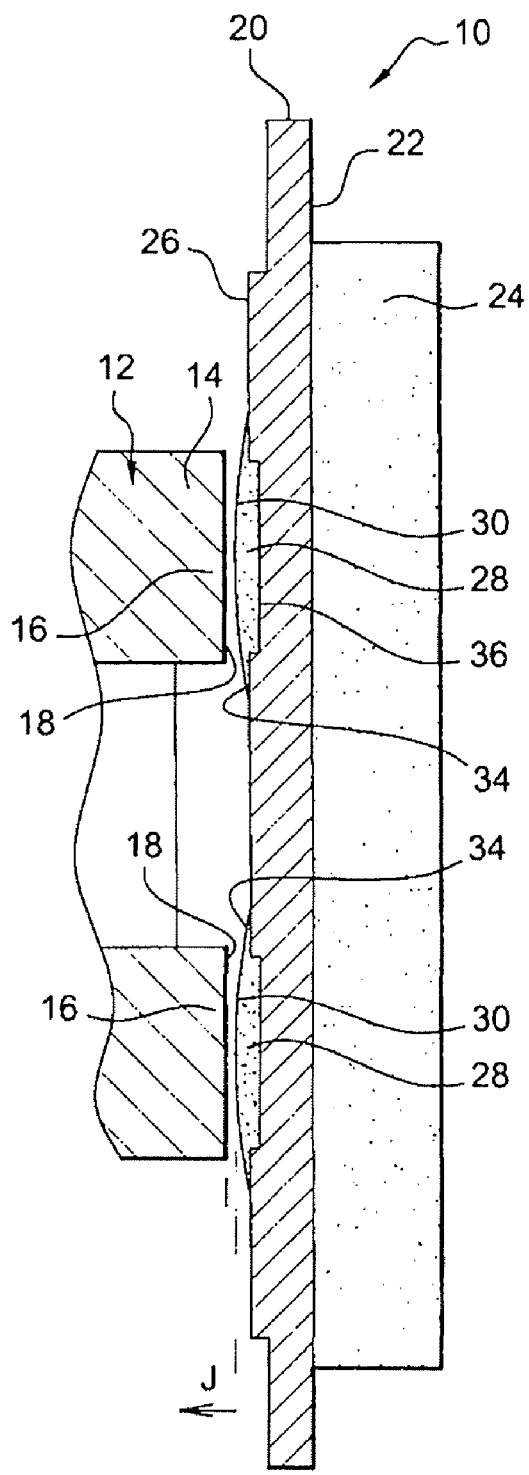
FIG. 1 is a view in section representing part of a caliper comprising a brake pad according to the invention during its mounting operation.
Figure 2:
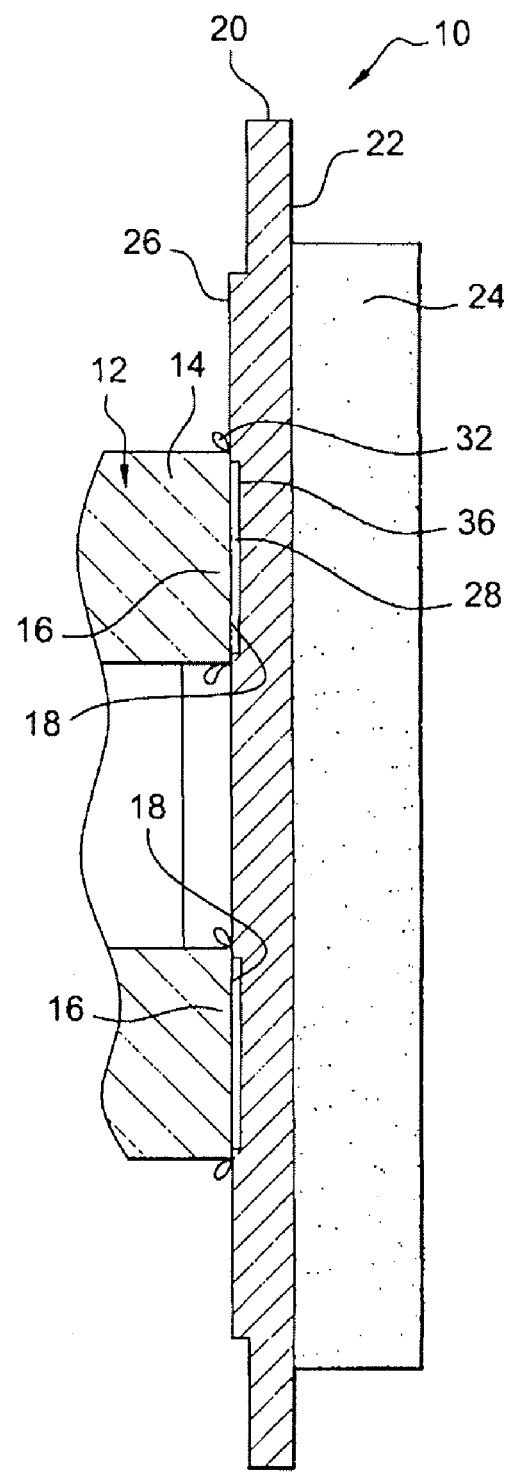
FIG. 2 is a view in section representing part of a caliper comprising a brake pad according to the invention during its first application.
Figure 3:
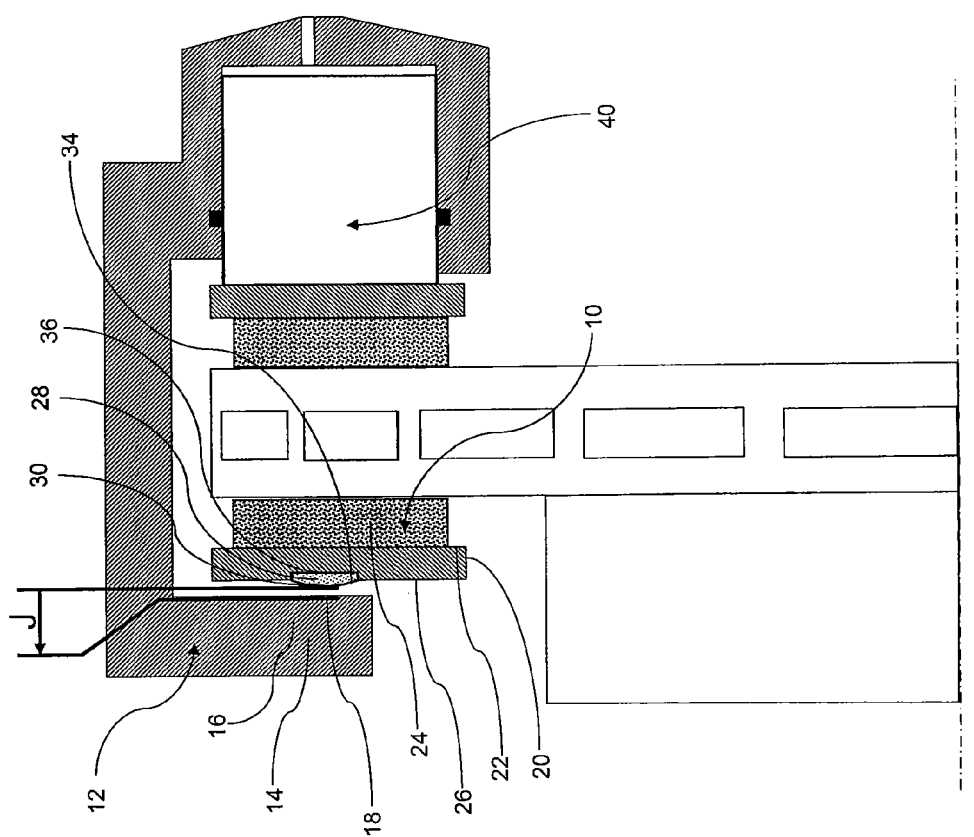
FIG. 3 is a view in section representing part of a caliper comprising a brake pad according to the invention during its mounting operation.

FIGS. 1-3 show a brake pad 10 for a motor vehicle disk brake (not shown).

In a known manner, the pad 10 is intended to be received in a hydraulic braking caliper 12, of which part has been represented in FIGS. 1 and 2.

In particular, the pad 10 forms part, in a known manner, of a set of two pads which are received in a floating brake caliper having the form of a U-shaped saddle of which a first branch receives a hydraulic piston 40 which is intended to apply one of the two pads against a rotating brake disk (not shown), and of which a second branch 14, also called "caliper nose", comprises two parallel fingers 16 against whose bearing faces 18 are received ends of the pad 10.

In a known manner, the pad 10 is intended to be received in a hydraulic braking caliper 12, of which part has been represented in FIGS. 1-3.

As has been represented in FIGS. 1-3, the pad 10 is thus applied against the rotating brake disk by the two bearing faces 18 of the fingers 16 forming the "caliper nose" when the floating caliper acts on the opposed pad by way of its hydraulic piston 40 (see FIG. 3).

In a known manner, the pad 10 comprises at least one plate-shaped support 20 of which an active face 22 carries a lining 24 made of a friction material and intended to be applied against the disk (not shown).

An opposed application face 26 of the support 20 is intended to be acted on by at least two bearing faces 18 of the caliper 12.

When assembling such a caliper, it is necessary to lubricate the mutual contact surfaces of the pad 10 and of the caliper nose fingers 16 so as to allow slight rotations of the pad 10 during braking actions parallel to the surface of the brake disk.

This lubrication is generally performed with a brush by an operator who coats the bearing faces 18 of the caliper nose fingers 16 and the application face 26 of the support 20 of the pad 10 with grease.

This operation is awkward since it has to be performed without depositing any grease on the lining 24 of the pad 10. Consequently, it is inappropriate for a mass-production assembly process.

To overcome this drawback, as illustrated in FIG. 1, the application face 26 of the pad 10 comprises at least one grease reservoir 28, of which at least one destructible wall 30, which is intended to be directed toward the bearing face 18 of the associated brake caliper, is intended to be mounted with a clearance "J" with respect to the bearing face 18 of the caliper 12 during the operation of mounting the pad 10 in the caliper 12.

In the preferred embodiment of the invention which concerns a pad associated with a caliper comprising two fingers 16 forming a caliper nose, it will be understood that the application face 26 of the pad 10 comprises two grease reservoirs 28 and two destructible walls 30 associated with the two fingers 16 of the caliper 12.

The destructible walls 30 are intended, as illustrated in FIG. 2, each to be destroyed by the corresponding bearing face 18 of the caliper 12 during the first application of the pad 10 so as to allow diffusion of the grease 30 between the application face 26 of the pad and the bearing face 18 of the associated caliper 12.

Preferably, the wall 30 of the grease reservoir 28 consists of a destructible film which entraps the grease 32 between said film 30 and the application face 26. As represented in FIG. 1, to fix the film 30 to the application face 26, the edges 34 of the film 30 adhere to the application face 26 of the pad.

Advantageously, provision can be made for the capacity of the grease reservoir 28 to be greater than the volume defined between the application bearing face 26 of the pad 10 and the film 30. To this end, the reservoir 28 comprises at least one fixed wall which is delimited by a cavity 36 which is formed within the thickness of the plate-shaped support 20 and which opens out into the application face 26.

When the bearing face 18 of the caliper 12 destroys the film 30 forming the destructible wall, it pushes back the film residues 30 inside the cavity 36, the effect of which is to expel all of the grease contained in the cavity 36.

The cavity 36 thus makes it possible to benefit from an additional grease volume which can be used entirely.

The invention therefore makes it possible to automatically lubricate the mutual contact surfaces of the pad 10 and of the caliper nose fingers 16 without intervention by any operator.

The invention claimed is:

1. A brake pad (10) for a motor vehicle disk brake received in a hydraulic braking caliper (12) and operable to be applied by said caliper (12) against a rotating brake disk, the brake pad (10) comprising at least one plate-shaped support (20) of which an active face (22) carries a lining (24) made of a friction material and to be applied against the disk, and of which an opposed application face (26) is directly engaged by at least one end bearing face (18) of the caliper (12), characterized in that the application face (26) of the pad comprises at least one reservoir (28) of grease (32), of which at least one destructible wall (30) is to be directed toward the bearing face (18) of the associated brake caliper (12), is to be mounted with a clearance (J) with respect to said bearing face (18) of the caliper (12) during the operation of mounting the pad (10) in the caliper (12), and is then to be destroyed by said bearing face (18) during the first application of the pad (10) so as to allow diffusion of the grease (32) between the application face (26) of the pad and the bearing face (18) of the associated caliper (12).

2. A brake pad (10) according to claim 1, characterized in that said brake pad (10) is to be received in a caliper (12) substantially taking the form of a U-shaped saddle of which one branch receives a hydraulic piston and of which the other branch (14) comprises two substantially parallel bearing fingers (16) each having a bearing face (18) directly engaging one end of the pad (10), and in that said brake pad (10) comprises a grease reservoir (28) associated with each of the bearing fingers (16).

3. A brake pad (10) for a motor vehicle disk brake received in a hydraulic braking caliper (12) and operable to be applied by said caliper (12) against a rotating brake disk, the brake pad (10) comprising at least one plate-shaped support (20) of which an active face (22) carries a lining (24) made of a friction material and to be applied against the disk, and of which an opposed application face (26) to be acted on by at least one end bearing face (18) of the caliper (12), characterized in that the application face (26) of the pad comprises at least one reservoir (28) of grease (32), of which at least one destructible wall (30) is to be directed toward the bearing face (18) of the associated brake caliper (12), is to be mounted with a clearance (J) with respect to said bearing face (18) of the caliper (12) during the operation of mounting the pad (10) in the caliper (12), and is then to be destroyed by said bearing face (18) during the first application of the pad (10) so as to allow diffusion of the grease (32) between the application face (26) of the pad and the bearing face (18) of the associated caliper (12), characterized in that the wall (30) of the reservoir (28) of grease (32) consists of a destructible film which entraps the grease (32) between said film (30) and the application face (26), and edges (34) of which film (30) adhere to the application face (26).

4. A brake pad (10) according to claim 3, characterized in that the reservoir (28) comprises at least one fixed wall which is delimited by a cavity (36) which is formed within the thickness of the plate-shaped support (20) and which opens out into the application face (26), the fixed wall and the film (30) cooperating to retain grease therebetween.

5. A brake pad (10) according to claim 4, characterized in that said brake pad (10) is to be received in a caliper (12) substantially taking the form of a U-shaped saddle of which one branch receives a hydraulic piston and of which the other branch (14) comprises two substantially parallel bearing fingers (16) each having a bearing face (18) intended to act on one end of the pad (10), and in that said brake pad (10) comprises a grease reservoir (28) associated with each of the bearing fingers (16).

6. A brake pad (10) according to claim 4, characterized in that, after destruction, residue of the wall (30) is pushed into the cavity (36) to expel grease (32) from the cavity (36).

7. A brake pad (10) according to claim 4, characterized in that the application face (26) has a surface, and in that the film (30) projects outwardly beyond the surface.

8. A brake pad (10) according to claim 4, characterized in that the cavity (36) has a cavity volume, and in that the cavity (36) and the film (30) cooperate to retain a volume of grease greater than the cavity volume.

9. A brake pad (10) according to claim 3, characterized in that said brake pad (10) is to be received in a caliper (12) substantially taking the form of a U-shaped saddle of which one branch receives a hydraulic piston and of which the other branch (14) comprises two substantially parallel bearing fingers (16) each having a bearing face (18) intended to act on one end of the pad (10), and in that said brake pad (10) comprises a grease reservoir (28) associated with each of the bearing fingers (16).

10. A brake pad (10) according to claim 3, characterized in that the reservoir (28) has a reservoir periphery at a surface of the application face (26), and in that the edges of the wall (30) are adhered to the application face (26) around the reservoir periphery.

11. A brake pad (10) according to claim 3, characterized in that the application face (26) has a surface, and in that the film (30) projects outwardly beyond the surface.

12. An assembly for a motor vehicle disk brake, the assembly comprising a brake pad (10) and a hydraulic braking caliper (12), the brake pad (10) being received by said caliper (12) and operable to be applied by said caliper (12) against a rotating brake disk, the brake pad (10) including at least one plate-shaped support (20) of which an active face (22) carries a lining (24) made of a friction material and positioned to be applied against the disk, and of which an opposed application face (26) is directly engaged by at least one end bearing face (18) of the caliper (12), characterized in that the application face (26) of the pad comprises at least one reservoir (28) of grease (32), of which at least one destructible wall (30) is directed toward the bearing face (18) of the associated brake caliper (12) and mounted with a clearance (J) with respect to said bearing face (18) of the caliper (12) during the operation of mounting the pad (10) in the caliper (12), the wall (30) being destroyed by said bearing face (18) during the first application of the pad (10) causing diffusion of the grease (32) between the application face (26) of the pad and the bearing face (18) of the associated caliper (12).

13. An assembly according to claim 12, characterized in that the wall (30) of the reservoir (28) of grease (32) consists of a destructible film which entraps the grease (32) between said film (30) and the application face (26), and edges (34) of which film adhere to the application face (26).

14. An assembly according to claim 13, characterized in that the reservoir (28) has a reservoir periphery at a surface of the application face (26), and in that the edges of the wall (30) are adhered to the application face (26) around the reservoir periphery.

15. An assembly according to claim 13, characterized in that the application face (26) has a surface, and in that the film (30) projects outwardly beyond the surface.

16. An assembly according to claim 12, characterized in that the reservoir (28) comprises at least one fixed wall which is delimited by a cavity (36) which is formed within the thickness of the plate-shaped support (20) and which opens out into the application face (26), the fixed wall and the film (30) cooperating to retain grease therebetween.

17. An assembly according to claim 16, characterized in that the application face (26) has a surface, and in that the film (30) projects outwardly beyond the surface.

18. An assembly according to claim 16, characterized in that the cavity (36) has a cavity volume, and in that the cavity (36) and the film (30) cooperate to retain a volume of grease greater than the cavity volume.

19. An assembly according to claim 12, characterized in that the caliper (12) substantially takes the form of a U-shaped saddle of which one branch receives a hydraulic piston and of which the other branch (14) comprises two substantially parallel bearing fingers (16) each having a bearing face (18) directly acting on the application face (26), and in that said brake pad (10) comprises a grease reservoir (28) associated with each of the bearing fingers (16).

20. An assembly according to claim 12, characterized in that, after destruction, residue of the wall (30) is pushed by the bearing face (18) into the cavity (36) to expel grease (32) from the cavity (36).

\* \* \* \* \*